Sept. 28, 1937.  F. KOENIG  2,094,238
GRIPPING TOOL
Filed Dec. 11, 1936
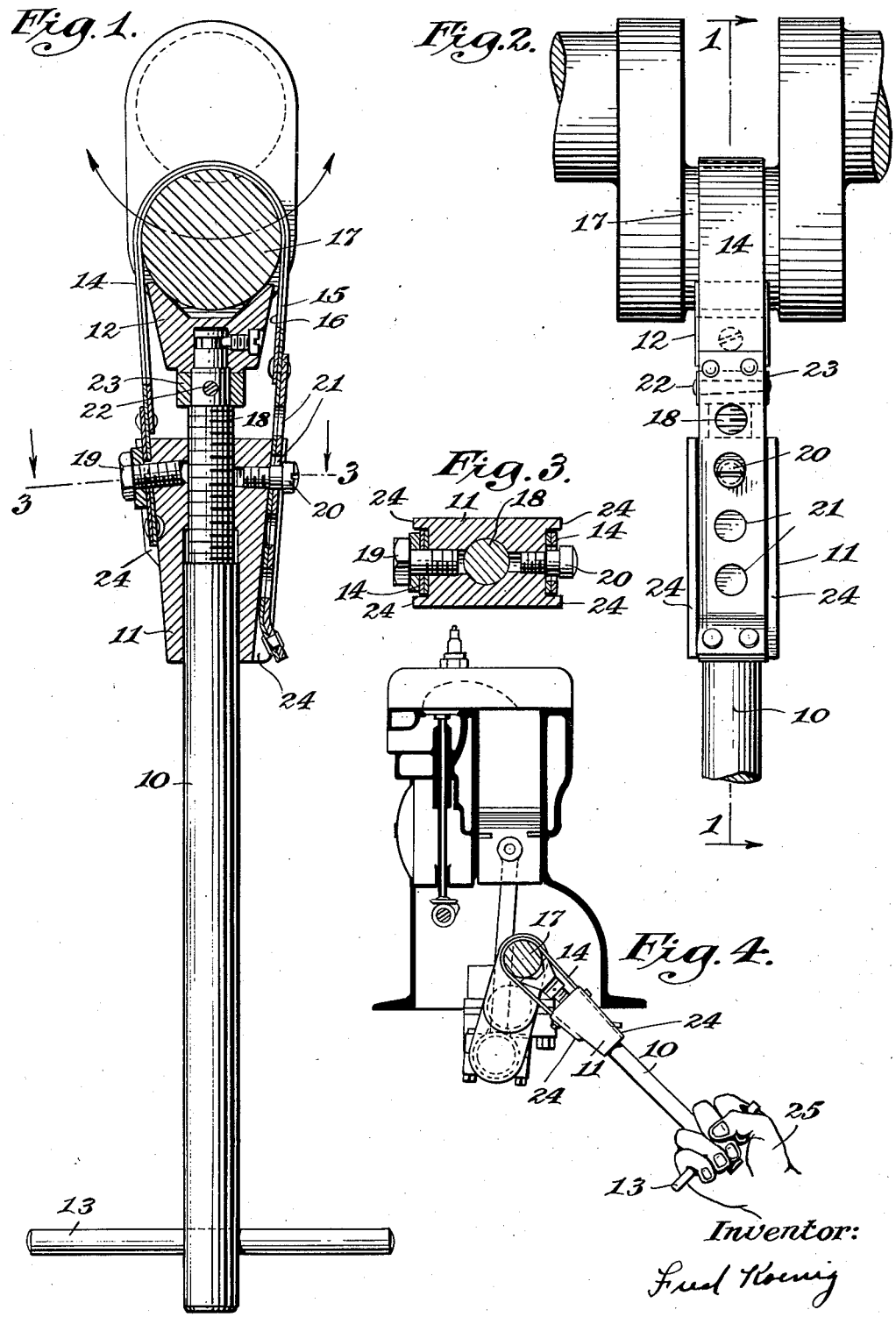
Inventor:
Fred Koenig Patented Sept. 28, 1937

2,094,238

UNITED STATES PATENT OFFICE 2,094,238

GRIPPING TOOL

Fred Koenig, Tottenville, N. Y.

Application December 11, 1936, Serial No. 115,333

2 Claims. (Cl. 81—65)

This invention relates to gripping tools and has for its object to provide such a tool which is specially adapted to rotate the crank-shaft of an automobile when the lower portion of the crank case has been removed. Another object is to provide a tool which is adapted to tightly grip an object without lost motion and without scratching or cutting the object to be gripped.

In automobile repair work it is often necessary to drop the oil pan to obtain access to the crank-shaft in replacing piston rings, wrist pins, and connecting rod bearings, etc. A gripping tool capable of rotating the crank shaft must be compact in design, easily attached and detached, and not likely to scratch the crank or shaft. It must also grip the objects solidly and be comparatively free from any lost motion. One cause of said lost motion has been that a nut on the tool handle has been able to turn very slightly with respect to the object to be gripped. One proposed solution for this difficulty has contemplated a separate guide bar along which the nut may translate without rotation, but this suggestion has been open to the objection of being bulky, requiring the tool to be of large width and making it unsuitable for the foregoing use in connection with automobile repair work.

According to this invention, rotation of the nut is prevented by the use of grooves cooperating with a metal band or strap which is stiff and inflexible to prevent rotation of the nut, but readily flexed in a normal direction to allow the band to be placed around the crank-shaft or other object to be gripped.

Referring to the drawing, Fig. 1 is a section on the line 1—1 of Fig. 2.

Fig. 2 is a side view of the device of Fig. 1.

Fig. 3 is a section on the line 3—3 of Fig. 1.

Fig. 4 shows one use of this invention applied to an automobile engine when the oil pan has been removed.

This tool includes a handle 10, having a nut, 11, arranged between a swiveled abutment member, 12, and a transverse hand grip, 13. For holding the work against the abutment, 12, a band, 14, is provided which is shown as being of two thicknesses, the outer part, 15, being of steel or other strong and hard material, whereas the inner part, 16, is of soft bronze or brass to avoid scratching or cutting the object, 17, to be gripped. In Figs. 1 and 2 this object, 17, is shown as being a portion of a crankshaft. The nut, 11, moves toward or from the abutment, 12, as the handle is rotated, the nut cooperating with the threaded portion, 18. For firmly securing one end portion of the band, 14, a bolt, 19, is shown as being screwed into the nut, 11. On the other side of the nut, 11, is a threaded pin, 20, having an enlarged head adapted to be passed through the holes, 21, in the end portion of the band, 14. When the band is tightened the head of the pin, 20, engages a portion of the edge of one hole, 21, to prevent the band coming off.

A collar, 23, is secured to the handle, 10, by a pin, 22, and also abuts the enlarged threaded portion, 18, of the handle, in order to withstand the thrust from the abutment member, 12. A set-screw, illustrated, engages a groove in the end portion of the handle, 10, to retain the abutment, 12, on the handle and keep it from falling off.

The nut, 11, is provided with a groove on each side in which the band is received, there being ribs, 24, forming the sides of said grooves. While the drawing shows clearance between the side edges of the band and the sides of said groove, it will be understood that preferably the band fits snugly in said grooves for the purpose of cooperating with the ribs, 24, to prevent rotation of the nut, 11, relative to the object to be gripped. The band is flexible enough to be bent around the crank-shaft, 17, but is not flexible in a normal direction and prevents rotation of the nut.

According to the use of this tool exemplified in Fig. 4, the band, 14, is bent around the crank-shaft, 17, and adjustably attached to the nut, 11, by the pin, 20, so that the nut is reasonably close to the abutment, 12, and the band or strap, 14, is of no greater length than necessary. When the band, 14, is comparatively short it is substantially rigid and inflexible so as to prevent the nut being rotated, the ribs, 24, or sides of the grooves fitting snugly against the sides of the band, 14, for this purpose. An operator's hand may grasp the handle grip as is shown in Fig. 4. In this position by turning the wrist the band may be loosened without changing the position of the hand on the tool and the handle, 10, rotated in a clock-wise direction in Fig. 4. The operator's hand 25 can then be again rotated by a wrist motion to tighten the band 14 and clamp the tool against the crank-shaft and the tool rotated with the work in a counter-clock-wise direction. The pitch of the threads, 18, is sufficient to give the nut enough translation to loosen or tighten the band with the rotation of the wrist, so that the tightening of the tool, loosening it, and rotation of the tool both with and without the work, is all possible with one hand, the other hand being left available for other duties. With the hand in the position shown in Fig. 4 the tool is securely attached to the work so that small movements of the tool and the work are possible without any lost motion such as might occur if there were a number of joints in the band which might enable the nut to be slightly rotated in tightening and loosening or rotating the tool. The nut and the entire tool are small and do not occupy as much space as has been necessary with some of the previous tools which have been provided with means for preventing rotation of the nut. Another advantage of this invention is the contact of the band with a large portion of the periphery of the object to be gripped. Neither the abutment nor the band is in danger of scratching the work, 17, the side of the V-shaped recess being substantially tangential to the work.

I claim:

1. A gripping tool adapted to be placed on the crank shaft of an automobile, which includes a handle having a threaded portion, a nut on said threaded portion, a hand grip on the handle extending transversely thereof, a swiveled abutment on the handle with the nut between said abutment and hand grip, a band which is adjustably secured to said nut on at least one side, is adapted to be bent around the object to be gripped and is attached directly to said nut on the opposite side, said band being of strong, hard metal on the outside and lined with a soft metal on its side contiguous the object to be gripped, said abutment being provided with a V-shaped recess, the sides of which are adapted to be substantially tangential to the object to be gripped and capable of gripping said object without scratching or cutting the same, the adjustable end of said band contiguous the nut being received within a groove, the sides of which are substantially contiguous the side edges of the band, whereby when the band is tightened, the sides of said groove cooperate with the band to prevent any partial rotation of said nut.

2. A gripping tool adapted to be placed on the crank shaft of an automobile, which includes a handle having a threaded portion, a nut on said threaded portion, a hand grip on the handle extending transversely thereof, a swiveled abutment on the handle with the nut between said abutment and hand grip, a band which is adjustably secured to said nut on at least one side, is adapted to be bent around the object to be gripped and is attached directly to said nut on the opposite side, said band being of strong, hard metal on the outside and lined with a soft metal on its side contiguous the object to be gripped, said abutment being provided with a V-shaped recess, the sides of which are adapted to be substantially tangential to the object to be gripped and capable of gripping said object without scratching or cutting the same, the adjustable end of said band contiguous the nut being received within a groove, the sides of which are substantially contiguous the side edges of the band, whereby when the band is tightened, the sides of said groove cooperate with the band to prevent any partial rotation of said nut, the threads on the handle being of such pitch that the band may be loosened by a partial turn of the hand and the tool rotated on the object to be gripped, the hand grip again rotated to tighten the band and rotate the object to be gripped, all without releasing the hand from the tool or changing the position of the hand on the tool, whereby said tool may be easily operated with one hand.

FRED KOENIG.